(12) United States Patent
Wang et al.

(10) Patent No.: US 9,467,697 B2
(45) Date of Patent: Oct. 11, 2016

(54) METHOD AND APPARATUS FOR PACKETIZING DATA

(75) Inventors: Yu Wang, Singapore (SG); Jo Yew Tham, Singapore (SG); Kwong Huang Goh, Singapore (SG); Wei Siong Lee, Singapore (SG); Wenxian Yang, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 572 days.

(21) Appl. No.: 13/880,369

(22) PCT Filed: Oct. 20, 2011

(86) PCT No.: PCT/SG2011/000365
§ 371 (c)(1),
(2), (4) Date: Jul. 23, 2013

(87) PCT Pub. No.: WO2012/053979
PCT Pub. Date: Apr. 26, 2012

(65) Prior Publication Data
US 2013/0301741 A1 Nov. 14, 2013

Related U.S. Application Data

(60) Provisional application No. 61/394,785, filed on Oct. 20, 2010.

(51) Int. Cl.
H04N 7/12 (2006.01)
H04N 19/89 (2014.01)
H04N 19/895 (2014.01)

(52) U.S. Cl.
CPC ........ H04N 19/00933 (2013.01); H04N 19/89 (2014.11); H04N 19/895 (2014.11)

(58) Field of Classification Search
CPC ........... H04N 19/00933; H04N 19/89; H04N 19/895
USPC ..................................................... 375/240.26
See application file for complete search history.

(56) References Cited

U.S. PATENT DOCUMENTS

2003/0140347 A1* 7/2003 Varsa ................... H04N 21/236
725/90

OTHER PUBLICATIONS

Viktor Varsa, et al., "Slice Interleaving in Compressed Video Packetization", IEEE Packet Video Workshop (PV2000), retrieved from the Internet: http://vc.cs.nthu.edu.tw/home/paper/codfiles/wfcheng/200305132338/ Slice, interleaving in_compressed_video_packetization.pdf, pp. 1-12, (May 2000).*

(Continued)

Primary Examiner — Allen Wong
(74) Attorney, Agent, or Firm — Blakely, Sokoloff, Taylor & Zafman LLP

(57) ABSTRACT

A method for packetizing data representing a video sequence comprising a first frame and a second frame. The method comprising determining for at least one first area of a plurality of first areas of the first frame a second area of a plurality of second areas of the second frame such that, for different first areas different second areas are determined and such that, for each of the first areas, a measure of the distance between the second area determined for the first area and an area of the second frame whose location within the second frame corresponds to the location of the first area is above a value. The method further comprising grouping, for each of the first areas, data which the first area may be reconstructed and data from which the second area determined for the first area may be reconstructed into a packet.

20 Claims, 10 Drawing Sheets

(56) References Cited

OTHER PUBLICATIONS

PCT International Search Report for PCT Counterpart Application No. PCT/SG2011/000365, 3 pgs., (Jan. 16, 2012).
PCT Written Opinion of the International Searching Authority for PCT Counterpart Application No. PCT/SG2011/000365, 4 pgs., (Jan. 16, 2012).
PCT Notification concerning Transmittal of International Preliminary Report on Patentability (Chapter I of the Patent Cooperation Treaty) for PCT Counterpart Application No. PCT/SG2011/000365, 6 pgs., (May 2, 2013).
Viktor Varsa, et al., "Slice Interleaving in Compressed Video Packetization", IEEE Packet Video Workshop (PV2000), retrieved from the Internet: http://vc.cs.nthu.edu.tw/home/paper/codfiles/wfcheng/200305132338/Slice_interleaving_in_compressed_video_packetization.pdf, pp. 1-12, (May 2000).
Yao Wang, et al., "Error Control and Concealment for Video Communication: A Review", Proceedings of the IEEE, vol. 86, No. 5, pp. 974-997, (May 1998).

* cited by examiner

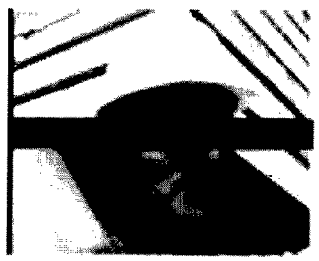 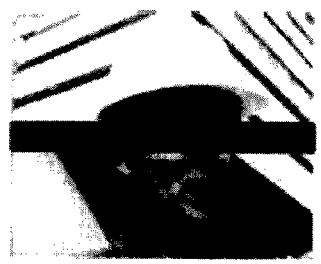 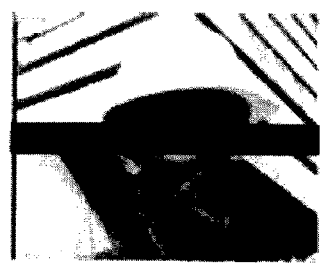
Fig. 12(b)(i)　　　Fig. 12(b)(ii)　　　Fig. 12(b)(iii)
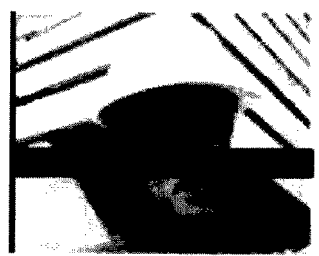 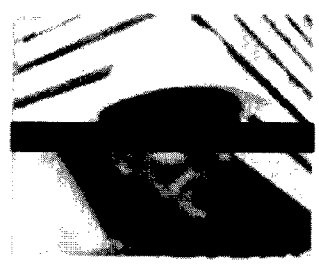 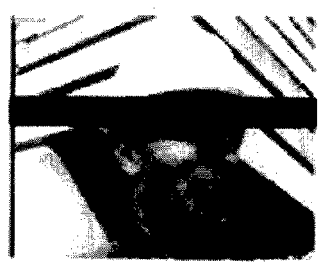
Fig. 12(c)(i)　　　Fig. 12(c)(ii)　　　Fig. 12(c)(iii)
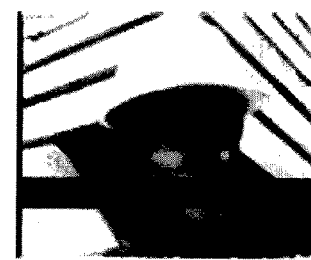  
Fig. 12(d)(i)　　　Fig. 12(d)(ii)　　　Fig. 12(d)(iii)

METHOD AND APPARATUS FOR PACKETIZING DATA

CROSS-REFERENCE TO RELATED APPLICATIONS

This patent application is a U.S. National Phase application under 35 U.S.C. §371 of International Application No. PCT/SG2011/000365, filed on Oct. 20, 2011, entitled METHOD AND APPARATUS FOR PACKETIZING DATA, which makes reference to and claims the benefit of priority of an application for "Distance-based Slice Interleaving Scheme for Robust Video Transmission over Error-prone Networks" filed on Oct. 20, 2010 with the United States Patent and Trademark Office, and there duly assigned Ser. No. 61/394,785. The content of said application filed on Oct. 20, 2010 is incorporated herein by reference for all purposes, including an incorporation of any element or part of the description, claims or drawings not contained herein and referred to in Rule 20.5(a) of the PCT, pursuant to Rule 4.18 of the PCT.

TECHNICAL FIELD

Various embodiments relate to the field of packetizing data, in particular, packetizing data of video sequences.

BACKGROUND

Recent advances in technology have led to a dramatic growth in network-based video applications. Video transmission over unreliable and error-prone wireless channel is one of the major challenges for wireless video applications. Due to the predictive coding and variable length coding, the compressed video is extremely sensitive to transmission errors. Video transmission over wireless networks suffers from packet loss due to either temporary packet drop or fading-induced bit errors. Therefore, the video applications have to provide sufficient robustness to ensure that the quality of the decoded video is not overly affected by the channel unreliability.

To deliver better quality video given a limited bandwidth, the challenging issue is to minimize the effect of packet loss while bringing little impact on bandwidth efficiency. Forward error correction (FEC) is broadly used to combat transmission errors. However, it consumes additional bits, which compromises coding efficiency. To achieve robustness without much loss in bandwidth efficiency, interleaving, a traditional approach in channel coding to mitigate the effect of burst errors, has been investigated. Interleaving schemes focus on dispersing the error distributions to facilitate error concealment. Error concealment mechanisms are typically more efficient if the damaged regions are small. For an instance, compared to smaller number of large errors, larger number of small erroneous regions distributed uniformly over the video bit-stream in both spatial and temporal dimensions usually result in better visual quality. Flexible Macroblock Ordering (FMO) is an interleaving tool introduced in H.264/AVC. It enables partition of a picture into slice groups, with each slice becoming an independently decodable subset of a slice group. The use of FMO, where spatial interleaving is explored, has been investigated. However, spatial interleaving may lead to dramatic decrease in coding efficiency. Besides, the errors can only be distributed spatially. To at least increase coding efficiency, temporal interleaving has been studied. However, the interleaving pattern is defined in a heuristic manner and the solution could not be generalized for any target number of packets.

Thus it is an object of the present invention to address at least the problems mentioned above and to provide methods and apparatus of packetizing data for improving the error robustness of the transmitted video without extra redundancy, which is highly desirable for bandwidth-limited networks.

SUMMARY OF THE INVENTION

In a first aspect, the present invention relates to a method for packetizing data representing a video sequence comprising a first frame and a second frame, wherein the data comprises data from which the first frame may be reconstructed and comprises data from which the second frame may be reconstructed, the method comprising determining for at least one first area of a plurality of first areas of the first frame a second area of a plurality of second areas of the second frame such that for different first areas different second areas are determined and such that, for each of the first areas, a measure of the distance between the second area determined for the first area and an area of the second frame whose location within the second frame corresponds to the location of the first area is above a value, wherein the value is the maximum value allowing that for at least one first area of the plurality of first areas of the first frame a second area of the plurality of second areas of the second frame is determined such that different first areas different second areas are determined and such that, for each of the first areas, a measure of the distance between the second area determined for the first area and an area of the second frame whose location within the second frame corresponds to the location of the first area is above the value, and grouping, for each of the first areas, data from which the first area may be reconstructed and data from which the second area determined for the first area may be reconstructed into a packet.

According to a second aspect, the present invention relates to an apparatus for packetizing data representing a video sequence comprising a first frame and a second frame, wherein the data comprises data from which the first frame may be reconstructed and comprises data from which the second frame may be reconstructed, the apparatus comprising a determining unit for determining for at least one first area of a plurality of first areas of the first frame a second area of a plurality of second areas of the second frame such that for different first areas different second areas are determined and such that, for each of the first areas, a measure of the distance between the second area determined for the first area and an area of the second frame whose location within the second frame corresponds to the location of the first area is above a value, wherein the value is the maximum value allowing that for at least one first area of the plurality of first areas of the first frame a second area of the plurality of second areas of the second frame is determined such that for different first areas different second areas are determined and such that, for each of the first areas, a measure of the distance between the second area determined for the first area and an area of the second frame whose location within the second frame corresponds to the location of the first area is above the value, and a grouping unit for grouping, for each of the first areas, data from which the first area may be reconstructed and data from which the second area determined for the first area may be reconstructed into a packet.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DETAILED DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

Figure 1:
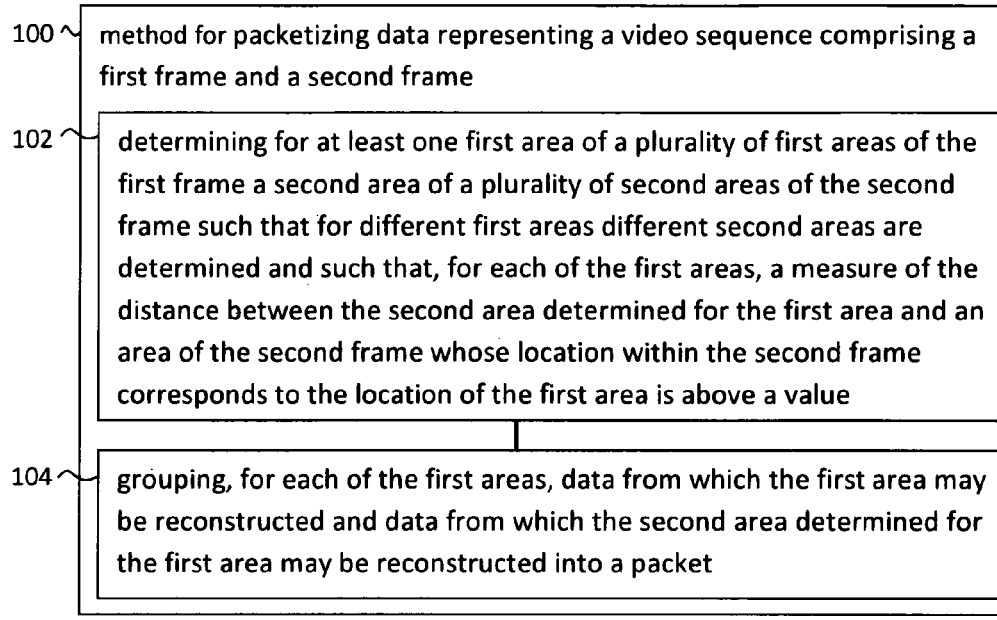
FIG. 1 shows a schematic block diagram of a method of packetizing data representing a video sequence, in accordance to various embodiments.

In a first aspect, a method for packetizing data representing a video sequence comprising a first frame and a second frame, wherein the data comprises data from which the first frame may be reconstructed and comprises data from which the second frame may be reconstructed, is provided as shown in FIG. 1. The method 100 comprises determining for at least one first area of a plurality of first areas of the first frame a second area of a plurality of second areas of the second frame such that for different first areas different second areas are determined and such that, for each of the first areas, a measure of the distance between the second area determined for the first area and an area of the second frame whose location within the second frame corresponds to the location of the first area is above a value 102, wherein the value is the maximum value allowing that for at least one first area of the plurality of first areas of the first frame a second area of the plurality of second areas of the second frame is determined such that for different first areas different second areas are determined and such that, for each of the first areas, a measure of the distance between the second area determined for the first area and an area of the second frame whose location within the second frame corresponds to the location of the first area is above the value, and grouping, for each of the first areas, data from which the first area may be reconstructed and data from which the second area determined for the first area may be reconstructed into a packet 104.

In the context of various embodiments, the term "determining" may generally refer to forming a link or establishing a relationship. For example, "determining" may also comprise a form of selection among components to be determined. The term "determining" may interchangably refer to "associating".

"Grouping" may generally mean combining or joining together to form a unit, and may involve the physical arrangement of components in uniting. For example in this context, the unit may be a packet.

As used herein, the term "packet" generally refers to a formatted block of data carried by a packet mode network or system. The term "packet" may also interchangeably be referred to as "data packet" or "video packet" in this context. The packet generally consists of two kinds of data: control information and payload. The packet mode network or system comprises links that support packets. This is in oppose to traditional point-to-point telecommunication links, which simply transmit data as a series of bytes, characters, or bits alone.

The term "area" refers to a collection of data in this context. The area may be of any size or shape, i.e., comprising any amount of data and any location of the data within a frame in this context. The data in this area may comprise several groups of data which are continuous or non-continuous, sequential or non-sequential so as long as the data is confined with the area having a single boundary. The term "area" may interchangably refer to a "slice".

As used herein, the term "frame" may refer to a collection of data representing an instantaneous picture or a snap-shot picture. Displaying a plurality of frames sequentially (in terms of time) forms a moving picture or a video sequence.

In the context of various embodiments, the term "value" refers to a numerical representation and may interchangably refer to a threshold value.

In various embodiments, the data from which different first areas may be reconstructed may be grouped into different packets.

In various embodiments, the at least one first area of the plurality of first areas of the first frame may comprise each first area of the plurality of first areas of the first frame. In some embodiments, the first frame and the second frame may be consecutive frames.

The term "consecutive" for example as applied to frames may mean frames following in a sequence, one frame succeeding another frame in an uninterrupted order. In this context, each frame is regarded as occurring at a discrete or instantaneous point in time. For example, a frame at time $Q_1$ succeeding another frame at time $Q_2$ are consecutive frames if there is no other frame occurring between $Q_1$ and $Q_2$; thereby providing an uninterrupted order of these two frames between $Q_1$ and $Q_2$.

The method in accordance to various embodiments may comprise generating a multiplicity of packets, wherein each packet includes data from which an area of a frame may be reconstructed, and wherein the packets are generated such that, for each packet and for any first area of a first frame for which data is included in the packet from which the first area may be reconstructed and for any second area of a second frame for which data is included in the packet from which the second area may be reconstructed, a combination of a measure of temporal distance of the first frame and the second frame within the sequence of video sequence and a measure of spatial distance between the second area of the second frame and an area of the second frame whose location within the second frame corresponds to the location of the first area of the first frame is above a value, wherein the value is the maximum value allowing that for each packet and for any first area of a first frame for which data is included in the packet from which the first area may be reconstructed and for any second area of a second frame for which data is included in the packet from which the second area may be reconstructed, a combination of a measure of the temporal distance of the first frame and the second frame within the sequence of video sequence and a measure of the spatial distance between the second area of the second frame and an area of the second frame whose location within the second frame corresponds to the location of the first area of the first frame is above the value.

In the context of various embodiments, the term "temporal distance" refers to the measure of distance between frames in a sequence. As used herein, "temporal" may also correspond to time. For example, a ten-second video clip (or sequence) may be made up of ten separate frames (or pictures), each frame being an instantaneous snap-shot taken at one-second intervals. In such a case, a period of time measured in seconds may be referred to (or mapped to) a temporal distance in terms of temporal units (or temporal positions), which may interchangably be referred to as frame indexes.

In various embodiments, the value may be based on a maximum minimal distance of the areas, determined by a distance-based interleaving structure. The distance-based interleaving structure $\Gamma^*$ can be written as:

$$\Gamma^* = \arg_\Gamma \max d_{min}(\Gamma)$$

where
$d_{min}(\Gamma)$ is the minimum among all $d_{min}^i$ under the interleaving structure $\Gamma$, represented by $$d_{min}(\Gamma) = \min_{i=0,1,2,\ldots,P-1} d_{min}^i;$$

$d_{min}^i$ is the minimal distance between any two areas in the $i^{th}$ packet, represented by $$d_{min}^i = \min_{L(t,s),L(t',s') \in \chi_i, L(t,s) \neq L(t',s')} d(L(t,s), L(t',s'));$$

$i=0, 1, \ldots, P-1$ with P being the total number of packets; $d(L(t,s),L(t',s'))$ is the Euclidean distance between a first area $L(t, s)$ and a second area $L(t', s')$ with t and t' denoting temporal positions while s and s' denoting spatial positions, the spatial positions being locations within a same frame, represented by $$d(L(t,s), L(t',s')) = \sqrt{d_T^2 d(L(t,s), L(t',s')) + d_S^2(L(t,s), L(t',s'))};$$

$d_T(L(t,s),L(t',s'))$ is the temporal distance between the first area and the second area, represented by $d_T(L(t,s),L(t',s'))=|t-t'|$; and $d_S(L(t,s),L(t',s'))$ is the spatial distance between the first area and the second area, represented by $d_S(L(t,s),L(t',s'))=\lambda|s-s'|$, where $\lambda$ is a scaling factor. The value of $\lambda$ may be about 1 to about 1.5.

In various embodiments, the distance-based interleaving structure $\Gamma^*$ may be configured to translate into a maximal-distance-producing translation matrix $U^*$ in a lattice across which all the packets are being substantially uniformly distributed.

The term "translate" may interchangably be referred to as "convert" or "transform", especially in the mathematical context of matrices.

As used herein, "lattice" may refer to a criss-crossed arrangement, which may be represented by two or more co-ordinal references or axes. For example, a lattice may be a grid or a mesh.

According to various embodiments, in the lattice, each packet may comprise about the same number of areas. Each packet may comprise a first area $L'(t, s)$, a second area $L'(t+u_{11}, s+u_{12})$, and a third area $L'(t+u_{21}, s+u_{22})$ where $u_{11}$, $u_{12}$, $u_{21}$, and $u_{22}$ are vector components forming a translation matrix U, represented by $$U = \begin{bmatrix} u_{11} & u_{21} \\ u_{12} & u_{22} \end{bmatrix}.$$

The translation matrix U may be an integer matrix. The vector components $u_{11}$, $u_{12}$, $u_{21}$, and $u_{22}$ may form a fundamental period in the lattice. For example, the fundamental period may be a parallelogram. The parallelogram may be a parallelogramatic structure or a parallelogramatic arrangement. The parallelogram may also be a rhombus.

In various embodiments, the maximal-distance-producing translation matrix $U^*$ may be selected from a set of translation matrices Us which are similar to a hexagonal shape. The set of translation matrices Us may be determined to be similar to a hexagonal shape by comparing the similarity between the fundamental period of each translation matrix U in the set and a typical hexagon.

In accordance to various embodiments, the maximum minimal distance may be a maximum of $d_{min}$ where $$d_{min} = \min\{\|(u_{11},\lambda u_{12})\|,\|(u_{21},\lambda u_{22})\|,\|(u_{11},\lambda u_{12})+(u_{21},\lambda u_{22})\|,\|(u_{11},\lambda u_{12})-(u_{21},\lambda u_{22})\|\}.$$

In various embodiments, the areas may be independently decodable areas of the video sequence. In this context, the term "independently decodable" refers to each area in a frame being decodable without referring to other areas in the same frame.

Figure 2:
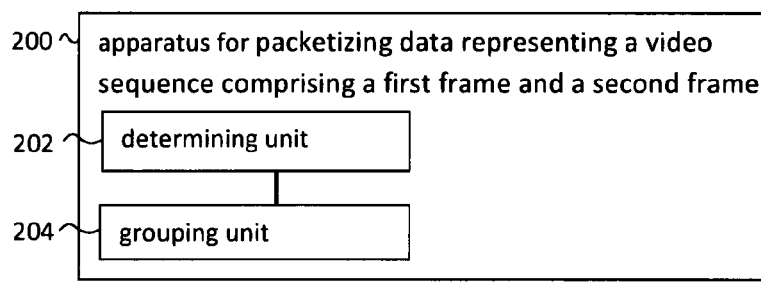
FIG. 2 shows schematic block diagram of an apparatus for packetizing data representing a video sequence, in accordance to various embodiments.

In a second aspect, an apparatus for packetizing data representing a video sequence comprising a first frame and a second frame, wherein the data comprises data from which the first frame may be reconstructed and comprises data from which the second frame may be reconstructed, is provided as shown in FIG. 2. The apparatus 200 comprises a determining unit 202 for determining for at least one first area of a plurality of first areas of the first frame a second area of a plurality of second areas of the second frame such that for different first areas different second areas are determined and such that, for each of the first areas, a measure of the distance between the second area determined for the first area and an area of the second frame whose location within the second frame corresponds to the location of the first area is above a value, wherein the value is the maximum value allowing that for at least one first area of the plurality of first areas of the first frame a second area of the plurality of second areas of the second frame is determined such that for different first areas different second areas are determined and such that, for each of the first areas, a measure of the distance between the second area determined for the first area and an area of the second frame whose location within the second frame corresponds to the location of the first area is above the value, and a grouping unit 204 for grouping, for each of the first areas, data from which the first area may be reconstructed and data from which the second area determined for the first area may be reconstructed into a packet.

The data from which different first areas may be reconstructed may be defined as above. The at least one first area of the plurality of first areas of the first frame may also be defined as above.

In some embodiments, the first frame and the second frame may be consecutive frames.

In various embodiments, the apparatus 200 according to various embodiments may be arranged to generate a multiplicity of packets, wherein each packet includes data from which an area of a frame may be reconstructed, and wherein the packets are generated such that, for each packet and for any first area of a first frame for which data is included in the packet from which the first area may be reconstructed and for any second area of a second frame for which data is included in the packet from which the second area may be reconstructed, a combination of a measure of temporal distance of the first frame and the second frame within the sequence of video sequence and a measure of spatial distance between the second area of the second frame and an area of the second frame whose location within the second frame corresponds to the location of the first area of the first frame is above a value, wherein the value is the maximum value allowing that for each packet and for any first area of a first frame for which data is included in the packet from which the first area may be reconstructed and for any second area of a second frame for which data is included in the packet from which the second area may be reconstructed, a combination of a measure of the temporal distance of the first frame and the second frame within the sequence of video sequence and a measure of the spatial distance between the second area of the second frame and an area of the second frame whose location within the second frame corresponds to the location of the first area of the first frame is above the value.

Figure 3:
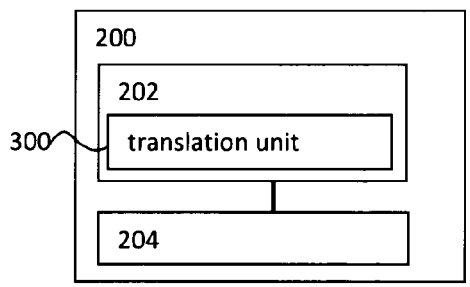
FIG. 3 shows schematic block diagram of an apparatus for packetizing data representing a video sequence, in accordance to various embodiments.

The value may be based on a maximum minimal distance of the areas, determined by a distance-based interleaving structure, which may be defined as above. In these embodiments, the determining unit 202 may further comprise a translation unit 300 (FIG. 3) for translating the distance-based interleaving structure Γ* into a maximal-distance-producing translation matrix U* in a lattice across which all the packets are being substantially uniformly distributed.

In the lattice, each packet may be defined as above. In some embodiments, in the lattice, each packet may comprise a first area L'(t, s), a second area L'(t+$u_{11}$, s+$u_{12}$), and a third area L'(t+$u_{21}$, s+$u_{22}$) where $u_{11}$, $u_{12}$, $u_{21}$, and $u_{22}$ are vector components forming a translation matrix U, as defined above. The vector components $u_{11}$, $u_{12}$, $u_{21}$, and $u_{22}$ may form a fundamental period in the lattice, as defined above.

In various embodiments, the maximal-distance-producing translation matrix U* may be selected from a set of translation matrices Us which are similar to a hexagonal shape. The set of translation matrices Us may be defined as above.

The maximum minimal distance may be a maximum of $d_{min}$ as defined above.

In various embodiments, the areas may be independently decodable areas of the video sequence as defined above.

In the context of various embodiments, the term "about" or "approximately" as applied to a numeric value encompasses the exact value and a variance of +/−5% of the value.

The phrase "at least substantially" may include "exactly" and a variance of +/−5% thereof. As an example and not limitation, the phrase "A is at least substantially the same as B" may encompass embodiments where A is exactly the same as B, or where A may be within a variance of +/−5%, for example of a value, of B, or vice versa.

In order that the invention may be readily understood and put into practical effect, particular embodiments will now be described by way of examples and not limitations, and with reference to the figures.

Figure 4:
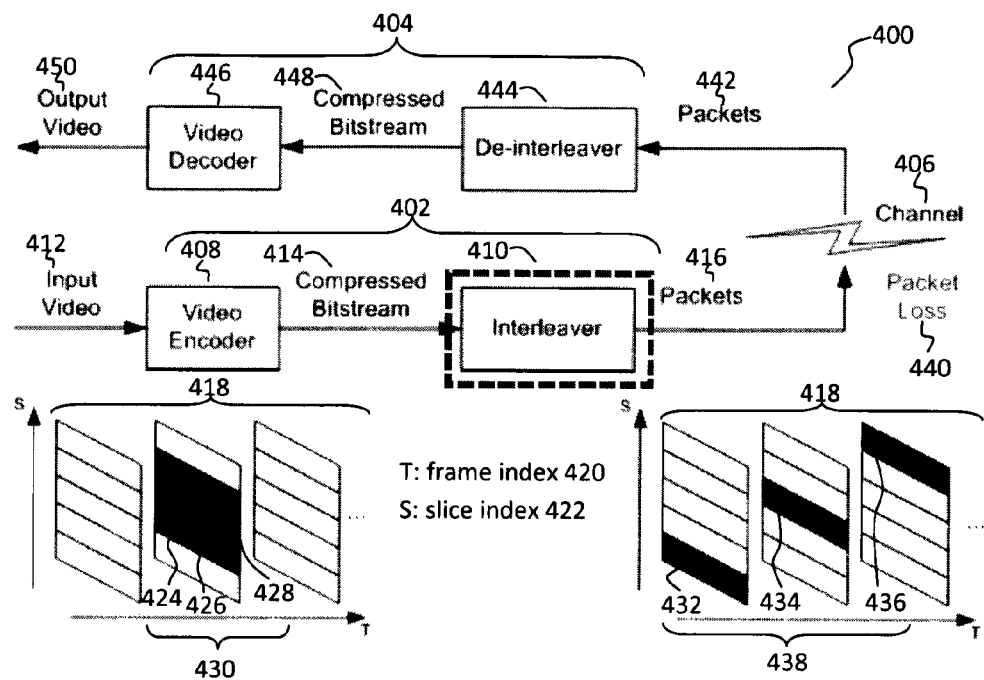
FIG. 4 shows a flow diagram representing a video transmission system, in accordance to various embodiments.

A slice interleaving algorithm in accordance to various embodiments is proposed for compressed video packetization in a video transmission system as generally illustrated in FIG. 4.

In FIG. 4, a video transmission system 400 generally comprises a transmitter 402 in communication with a receiver 404 via a channel 406. The channel 406 may be a wireless channel or a wired channel. The transmitter 402 comprises a video encoder 408 and an interleaver 410. The video encoder 408 receives an input video 412 (which may interchangeably be referred to as an input video signal) from a video source (not shown in FIG. 4) and encodes the input video 412 to give a compressed bitstream 414. The encoding and compression of the input video 412 may be based on a video encoding protocol, for example but not limited to MPEG-2 protocol or H.264 protocols.

The interleaver 410 receives the compressed bitstream 414 in the form of a group of frames 418, each frame being represented by a frame index (T) 420. The interleaver 410 is also interchangeably referred to as an apparatus for packetizing data representing a video sequence. The interleaver 410 generally divides each frame from the group of frames 418 into areas or interchangeably referred to as slices, each slice being represented by a slice index (S) 422. Following that, the interleaver 410 groups different slices into a packet. In the example shown in FIG. 4, the interleaver 410 may group areas or slices 424, 426, 428 into a packet 430. In yet another example, the interleaver 410 may group areas or slices 432, 434, 436 into a packet 438. All slices may be grouped into different packets 416. The interleaver 410 selects and groups slices into different packets 416 based on interleaving algorithms or interchangeably referred to as methods of packetizing data, for example, an algorithm (or method) in accordance to one embodiment described herein.

As used herein, the term "packet" is defined as above.

While transferring the packets 416 through the channel 406 to the receiver 404, packet loss 440 may occur to result in lossly packets 442. The receiver 404 comprises a de-interleaver 444 and a video decoder 446. The de-interleaver 444 generally performs the reverse functions of the interleaver 442 on the received packets 442 to obtain a compressed bitstream 448. The video decoder 446 decodes the compressed bitstream 448 to give a reconstructed output video 450 (which may interchangeably be referred to as an output video signal) to a video console (not shown in FIG. 4).

Figure 5:
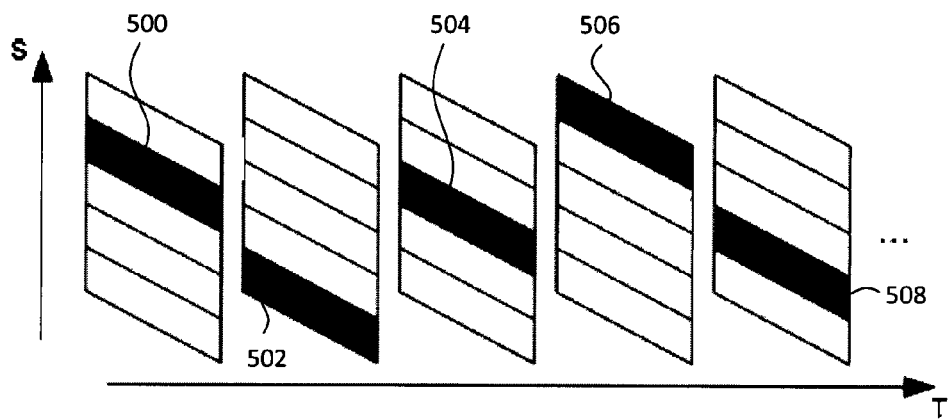
FIG. 5 shows an example scattered pattern, in accordance to various embodiments.

More specifically with respect to the interleaver 410 in accordance to various embodiments, each packet is constructed by interleaving independently decodable slices of the coded video bit-stream in the group of frames 418. Slices are grouped into packets according to the maximum minimal distance of these slices. That is, the slices in consecutive frames are optimally partitioned into packets considering the maximum minimal distance of these slices. The scattered pattern ensures that each lost slice has, as many as possible, spatial and temporal neighbours that belong to other correctly received packets. An example of a scattered pattern is shown in FIG. 5 with slides grouped in a packet being indicated by the shaded areas 500, 502, 504, 506, 508. In case packet loss occurs, the interleaving algorithm in accordance to various embodiments tries to distribute the errors in a non-contiguous or non-adjacent way, such that the decoder has, as much as possible, available information to reconstruct the missing content. As used herein, "non-adjacent or "non-contiguous" may refer to non-adjoining or non-abutting, typically at boundaries or part thereof between two or more components. The term "non-adjacent" may also refer to being non-overlapping of boundaries or parts thereof.

This algorithm in accordance to various embodiments greatly strengthens the error concealment performance compared with traditional or standard (known) methods. Examples demonstrate the superiority of the algorithm in accordance to various embodiments.

Overview of the Operation of an Interleaver

An overview of the operation of an interleaver is described herein and the slice interleaving problem is formulated as follow.

Figure 6:
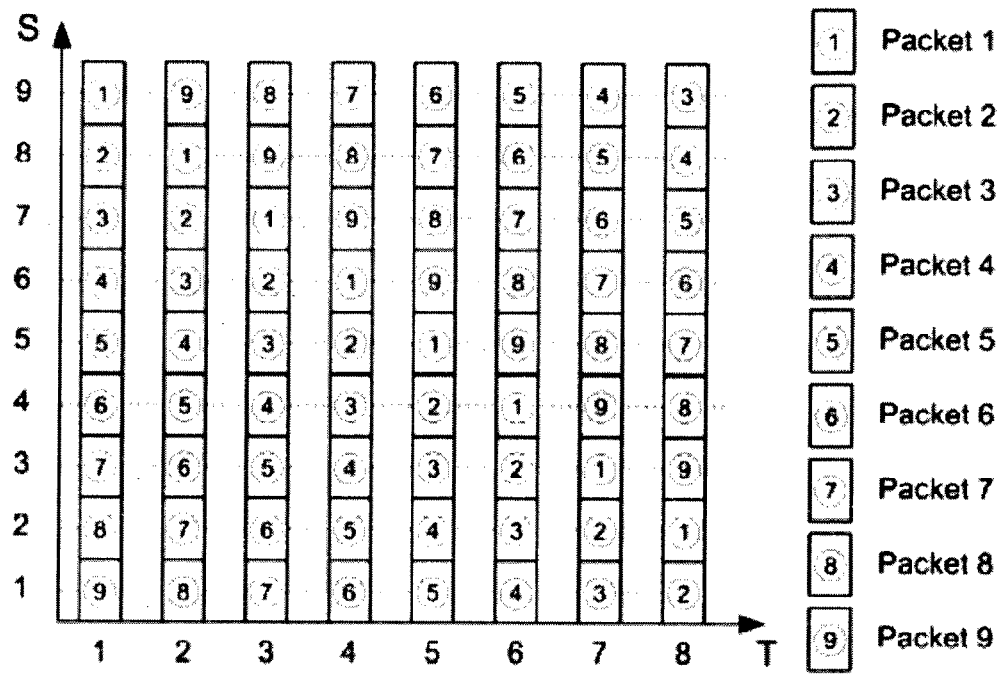
FIG. 6 shows an example of slice structure for a group of frames, in accordance to various embodiments.

An example of slice structure for a group of frames is illustrated in FIG. 6. The temporal position of a frame is denoted by T. Each frame is composed of a number of slices, which are fully independently-decodable video data. The spatial position of each slice is denoted by S. During interleaving packetization, the slices at different temporal and spatial position of consecutive frames are taken to constitute one packet.

For an instance, in FIG. 6, the slices with the same label are grouped together to generate a packet, where each packet is comprised of nine (9) slices from different frames. Therefore, a packet loss will only affect a small area of each frame. Because there is a high correlation between spatial and temporal neighboring slices, the lost slices could be concealed by utilizing the surrounding information to achieve an acceptable quality.

Suppose there are P packets created for a group of frames, $\chi_i$ represents the set of slices in the $i^{th}$ packet, where i=0, 1, ..., P-1.

$\{\chi_0, \chi_1, ..., \chi_{P-1}\}$ is a cover of all the slices and $\forall i \neq j$, $\chi_i \cap \chi_j = \emptyset$.

Let D denote the expected distortion of the reconstructed video. If all the packets are correctly received, D only contains quantization distortion $D_Q$. Assume that each packet has the same probability to be lost, which is denoted by p, D is formulated as $$D = D_Q + p \sum_{i=0}^{P-1} D_i \quad (1)$$

where $D_i$ is the distortion caused by loss of the $i^{th}$ packet. When error concealment is used, $D_i$ greatly depends on the ability of the decoder to estimate the missing information. $D_i$ could be calculated as follows, $$D_i = \sum_A D_i^{EC}(A) p(A|i) \quad (2)$$

with A being the set of neighboring information that are correctly received and used for error concealment and p(A|i) being the probability for the set of information A to be correctly received in case the $i^{th}$ packet is lost. $D_i^{EC}(A)$ denotes the distortion after error concealment with the set of information A.

$D_i$ is a function of $\Gamma$, where $\Gamma$ is the slice interleaving structure and $\Gamma = \{\chi_0, \chi_1, ..., \chi_{P-1}\}$.

Different slice interleaving structures result in different error distributions, hence may cause various error concealment distortions. Given the number of packets P, an optimal slice interleaving structure is established in order to minimize the distortion of the received video: The problem can be formulated as $$\Gamma^* = \{\chi_i^*\} = \{\chi_0^*, \chi_1^*, ..., \chi_{P-1}^*\} = \arg_\Gamma \min D \quad (3)$$

where $\Gamma^*$ is the optimal interleaving structure and $\chi_i$ is the optimal set of slices in the $i^{th}$ packet.

Interleaving Algorithm

The optimal interleaving problem can be resolved by using distortion as the optimization criteria. However, it is prohibited in real-time applications because calculating the error concealment distortion under different interleaving patterns consumes a lot of computation. Besides, the distortion also relies on the error concealment algorithm applied at the decoder. Any particular choice of the error concealment method may have its own optimal solution. To simplify the problem, a new objective function is demanded to achieve a good result under all possible scenarios.

The basic idea of the interleaving algorithm is to partition the slices in a group of frames according to a predefined interleaving structure. The structure is to be designed such that the neighboring slices are separated as far as possible. There are some reasons behind this idea. First, it is noted that successful estimation of a missing slice depends on the correlation of the missing information and the information used to do concealment. As the correlation is typically a decreasing function of distance, most of the error concealment algorithms prefer to conceal the missing slice from its immediate neighboring slices in both the temporal and the spatial directions. Second, the error concealment mechanism in general works more effectively given more available information. Bearing these notes in mind, a distance-based slice interleaving algorithm is developed. Therefore, a measurement of distance between two slices is defined, as follow: —

Definition 1:

Assuming two slices L(t, s) and L(t', s'), where t and t' represent the temporal position while s and s' denote the spatial position, the temporal distance between the two slices is defined as $$d_T(L(t,s), L(t',s')) = |t-t'| \quad (4)$$

The spatial distance between the two slices is defined as $$d_S(L(t,s), L(t',s')) = \lambda |s-s'| \quad (5)$$

where $\lambda$ is a scaling factor, introduced into the measurement due to the reason that the correlation between temporal neighboring slices is not the same with that of the spatial neighboring ones. Through examples, the value of $\lambda$ is selected to be in the range of about 1 to about 1.5. Then, the Euclidean distance between the two slices could be computed as $$d(L(t,s), L(t',s')) = \sqrt{d_T^2 d(L(t,s), L(t',s')) + d_S^2(L(t,s), L(t',s'))} \quad (6)$$

Definition 2:

As all the slices are partitioned into P packets, the minimal distance between any two slices in the $i^{th}$ packet (or interchangably referred to as the intra-packet distance in the $i^{th}$ packet) is defined to be $$d_{min}^i = \min_{L(t,s), L(t',s') \in \chi_i, L(t,s) \neq L(t',s')} d(L(t,s), L(t',s')) \quad (7)$$

Figure 7:
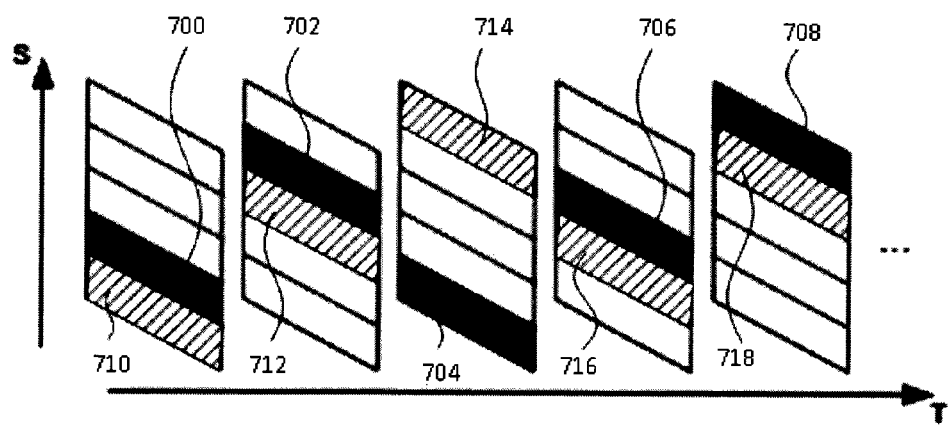
FIG. 7 shows an example scattered pattern reflecting intra-packet distances, in accordance to various embodiments.

In FIG. 7, the intra-packet distances in the $i^{th}$ packet, for example, may be represented by the distances between the full shaded area 700 in a frame and the full shaded area 702 in the next frame; the distances between the full shaded area 702 in that frame and the full shaded area 704 in the next frame; the distances between the full shaded area 704 in that frame and the full shaded area 706 in the next frame; and the distances between the full shaded area 706 in that frame and the full shaded area 708 in the next frame.

The intra-packet distances in the $(i+1)^{th}$ packet, for example, may be represented by the distances between the stripped shaded area 710 in a frame and the stripped shaded area 712 in the next frame; the distances between the stripped shaded area 712 in that frame and the stripped shaded area 714 in the next frame; the distances between the stripped shaded area 714 in that frame and the stripped shaded area 716 in the next frame; and the distances between the stripped shaded area 716 in that frame and the stripped shaded area 718 in the next frame.

Definition 3:

The minimum among all $d_{min}^i$ under the interleaving structure $\Gamma$ is defined to be $$d_{min}(\Gamma) = \min_{i=0,1,2,\ldots,P-1} d_{min}^i \quad (8)$$

As the goal is to disperse the neighbouring slices as far as possible, the objective can be written as $$\Gamma^* = \arg_\Gamma \max d_{min}(\Gamma) \quad (9)$$

Because the distance does not rely on specific error concealment method and its computation complexity is not high, the distance-based objective function is applicable for any scenarios. This problem could be solved as a lattice partitioning problem, where the slices in a group of frames could be regarded as a rectangular lattice.

Partitions of the lattice are translation-equivalent lattices of themselves, which means each lattice can be obtained from any other sub-lattice by translation. In this case, the minimal intra-partition distance is uniform across all the partitions, i.e., $\forall i, j, d_{min}^i = d_{min}^j$.

Through this way, packets (partitions) are uniformly distributed across the lattice, so each packet will contain approximately the same number of slices, ensuring that packets are almost equally important.

Because of the translation-equivalent property, the set of slices can be generated using the same basis vectors $u_1 = (u_{11}, u_{12})^T$ and $u_2 = (u_{21}, u_{22})^T$. If slice $L(t, s)$ belongs to a certain packet, slices $L(t+u_{11}, s+u_{12})$ and $L(t+u_{21}, s+u_{22})$ also belong to the same packet.

Figure 8A:
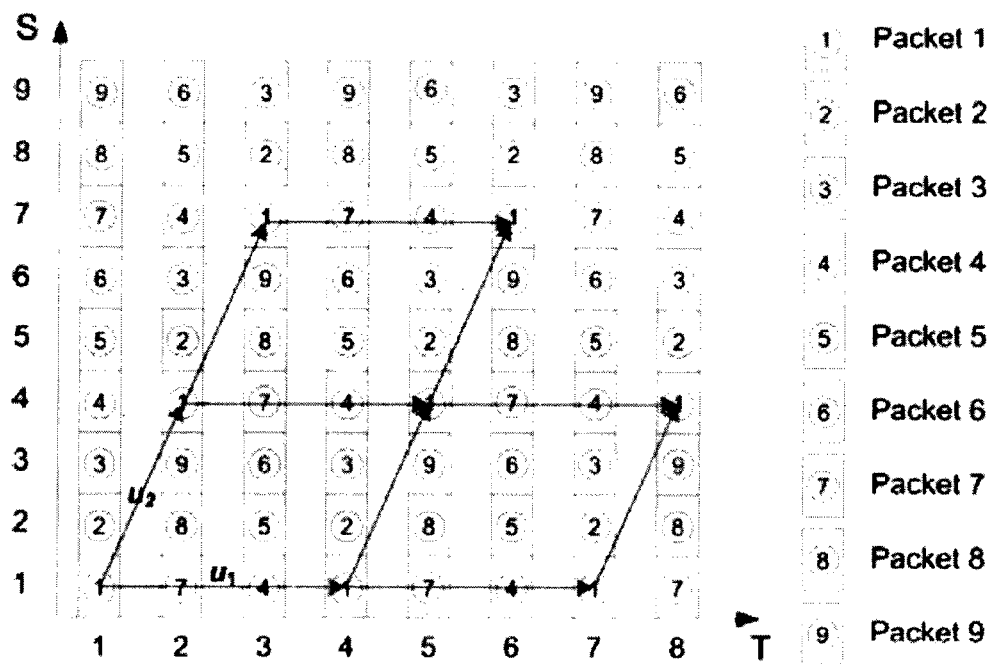
FIG. 8(a) shows an slice interleaving structure, in accordance to various embodiments.
Figure 8B:
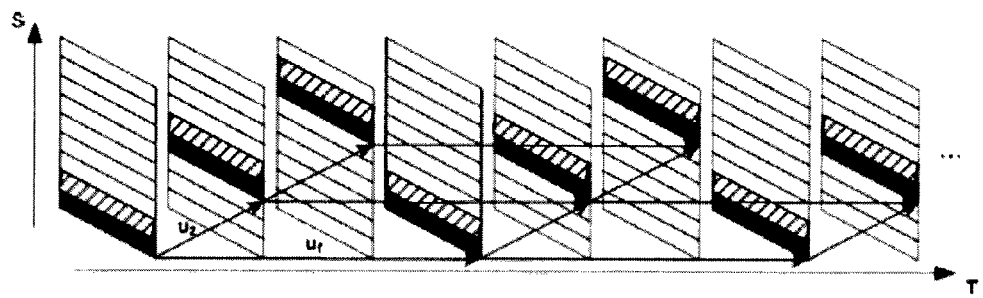
FIG. 8(b) shows a perspective representation of FIG. 8(a), in accordance to various embodiments.

As an example, FIG. 8(a) illustrates the slice interleaving structure when the basis vectors are $u_1=(3,0)^T$ and $u_2=(1,3)^T$. FIG. 8(b) shows a perspective representation of FIG. 8(a). It can be observed that the partitioning structure exhibits a generalized periodicity. Let U represent the translation matrix:

$$U = [u_1 | u_2] = \begin{bmatrix} u_{11} & u_{21} \\ u_{12} & u_{22} \end{bmatrix}$$

Since the basis vectors constitute a parallelogram (fundamental period), whose sides are $u_1$ and $u_2$, the area of such a parallelogram is $|\det U| = |u_{11}u_{22} - u_{12}u_{21}|$. If U is an integer matrix, the area equals to the number of lattice points inside the parallelogram. In other word, $|\det U|$ should be equal to the number of packets inside the group of frames. Therefore, $P = |\det U|$. Because all the packets are translation equivalent, the minimal distance between any two slices in a packet is the same for all the packets and is given by $$d_{min} = d_{min}(V) \quad (10)$$
$$= \min\{\|(v_1)\|, \|(v_2)\|, \|(v_1+v_2)\|, \|(v_1-v_2)\|\}$$

and $$V = [v_1 | v_2] = \begin{bmatrix} v_{11} & v_{21} \\ v_{12} & v_{22} \end{bmatrix}$$

with $v_{11}=u_{11}$, $v_{12}=\lambda u_{12}$, $v_{21}=u_{21}$, $v_{22}=\lambda u_{22}$.

The problem can be re-formulated as follows:

$$U^* = \arg \max d_{min}(V) \quad (11)$$

sub to $|\det U|=P$, U is an integer matrix where $d_{min}(V)$ is given by Equation (10).

Reference may further be made to the section below on "Groundwork on the Equations".

The problem stated above is a nonlinear programming problem, where the computational complexity is non-deterministic polynomial-time hard (NP-hard). Besides, a lot of matrices that are linearly dependent can satisfy the constraint, thus searching for the basis one is not a trivial work. To avoid exhaustive search, a fast algorithm is designed to quickly find a near optimal solution.

It is observed that given a fixed area of the parallelogram, the basis vectors, which generate sub-lattices that are hexagonal, achieve the maximum minimal intra-partition distance. Although the lattice cannot be partitioned into sub-lattices that are exactly hexagonal, sub-lattices that are approximately hexagonal can be found. Hence, the fast search algorithm is designed as follows: —

1) Search for the translation matrix U in a pre-defined range under the constraint of $|\det U|=P$, and achieve a set of candidate U.

2) Calculate the similarity between each candidate U's fundamental period and hexagonal. The candidate Us are ranked according to the similarity.

3) For a set of candidates, which are most similar to hexagonal, calculate dmin under each of them and select the U* that produces the maximal distance.

Reference may further be made to the section below on "Scrambler Algorithm".

Generalization of Packet Scrambler and Case Examples

Groundwork on the Equations

Suppose P packets. Let $\chi_i$ represents a set of slices in the $i^{th}$ packet. Then, the distribution (or scrambling pattern) of N slices over P packets (N>P) is represented by $$X(P,N) = \{\chi_i : 0 \leq i \leq P\} \tag{I}$$

$$|X(P,N)| = \sum_{i=0}^{P-1} |\chi_i| = N \tag{II}$$

and
$$\forall i \neq j,$$
$$\chi_i \cap \chi_j = \varnothing \tag{III}$$

N depends on the number of frames considered for any instance of scrambling. This is restricted by the latency considered in the application, which is in turn controlled by the QoE manager that is using this scrambling algorithm/tool.

The optimal scrambling pattern X* of slices across P packets is $$X^*(P,N) = \arg\min_{X} D(X(P,N)) \tag{IV}$$

where D is the distortion given by distribution X.

In order to minimize the impact when a packet is lost, slices in the same packet should be, as much as possible, distant from each other. Therefore, rewriting Equation (IV), optimal scrambling pattern would be $$X^* = \arg\max_{X} d_{min}(X) \tag{V}$$

where $$d_{min}(X) = \min_{\chi_i \in X} d_{min}(\chi_i) \tag{VI}$$

$$d_{min}(\chi) = \min_{L(v),L(u) \in \chi, u \neq v} \|L(v) - L(u)\| \tag{VII}$$

denotes the minimal distance between any two slices L within each packet. L(v) denotes a coded slice L indexed by description vector v∈F, where F is an ordered set of description vectors for indexing all slices. An example of a description vector for each slice is [slice_number, frame_number].

The distance between two slices L(v) and L(u) is defined as $$\|L(v) - L(u)\| = \|\Lambda \bullet (v-u)\|, u, v \in F, v \neq u \tag{VIII}$$

where $\Lambda = [\lambda_1, \lambda_2, \ldots, \lambda_K]^T$ (K=dim(F)) is a weight vector that is dependent on the nature of the description vector used in the scrambler and the characteristic of the error concealment technique considered at the decoder client.

Equation (V) can be solved as a lattice problem. Let T be the translation matrix collection of K×1 column vectors (t∈$\mathbb{Z}^K$) where $\mathbb{Z}$ represents all integers, $$T = [t_1, t_2, \ldots, t_K] \tag{IX}$$

The constraint is imposed that $$|det\ T| = P \tag{X}$$

which means that the number of packets to distribute the slices is P. By translational-equivalent property, the set of slices $$\{L(u+t): \forall t \in T, (u+t) \in F\} \tag{XI}$$

can be assigned to the same packet while maximizing Equation (VII).

To compute T, the problem in Equation (V) is re-formulated as finding the optimal translation matrix $$T^* = \arg\max d_{min}(\Lambda, T) \tag{XII}$$

where $$d_{min}(\Lambda, T) = \min\left\{\left\|\sum_{i=0}^{K} (\Lambda \circ t_i) e_i\right\| : e_i \in [-1, 0, 1]\right\} \tag{XIII}$$

The "Scrambler Algorithm" in the section below outlines an algorithm that includes a solution to Equation (XII).

The Scrambler Algorithm

In this section, the algorithm used according to one embodiment for implementing the concept described in the above "Groundwork on the Equations" section is outlined. The following algorithm shows how the optimal translation matrix T* in Equation (XII) can be derived:

Step 1a: Let N be the number of slices to be distributed to P packets.
Step 1b: Let F be the ordered set of description vector that index the N slices.
Step 1c: Let A be the input weights.
Step 1d: Let K=dim(F).
Step 1e: Let the initial optimal translation matrix T*=∅.
Step 1f: Let $e_{prev} = +\infty$.
Step 2: Let U be a random collection of K×1 column vectors (u∈F), $$U = \{u_i \in F - \{f_0\}: i=1,2,\ldots,K\}$$

subject to $u_i \neq u_j$ for i≠j.
Step 3: Let the candidate translation matrix be $$T = \{t_i = \Lambda \bullet (u_i - f_0) : u_i \in U, f_0 \in F\}$$

subject to |det T|=P.
Step 4: Measure error $$e = \sum_{1 \leq i,j \leq K, i \neq j} \left|\arccos\left(\frac{\langle t_i, t_j \rangle}{\|t_i\|\|t_j\|}\right) - \frac{\pi}{3}\right|$$

Step 5: if $e < e_{prev}$ then $e_{prev} = e$ and T*=T.
Step 6: Repeat Step 2-6 until all possible combinations of the set U is exhausted.
Step 7: T* is the optimal translation matrix.

The following algorithm shows how to distribute the slices into packets:—

Step 1a: Input optimal translation matrix T*.
Step 1b: Input set S={$(L_i, f_i)$: 1≤i≤N} where L is the slice data and f is its corresponding index vector.
Step 1c: Initialize X={$\chi_i$={L($f_i$)}: 0≤P}.
Step 1d: Initialize indx=0.
Step 2: /* Represent all the possible translated indexes of initial slice L($f_{indx}$). */

Let $G = \{g = f_{indx} + jt_j : j \in \mathbb{Z}, g \in F\}$

Step 3: /* Add all slices given by index set G to the $indx^{th}$ packet. */

Let $\chi_{indx} = \chi_{indx} + L(G)$.

Step 4: indx=indx+1;
Step 5: if indx<P, goto Step 2;
Step 6: Completed. X contains all slices in S allocated to each packet χ∈X.

Recapping, the objective according to one embodiment is to scramble coded slice data packets such that, in the situation of network packet loss, the efficiency of any arbitrary error concealment at the decoder can be maximized. It is thus reasonable to assume that general error concealment methods are most effective when neighboring spatial or coded information is maximally available. In other words, a loss slice can be effective concealed if its spatial (intra) and temporal-co-located (inter) neighboring slice data are available. In the case of scalable video coding, such as in the H.264/SVC, this will include its inter-layer co-located neighbors.

The rational is that these neighbors are likely to have the highest correlation with the missing slice data, and hence would be the best candidates for predicting loss data, i.e. error concealment. As such, picture coding order (e.g. Hierarchical B-frames coding structure) and picture coding types (e.g. Intra I or Inter P/B) need not be considered as input parameters to the generalized scrambling model.

Use Cases

This section outlines scenarios to which the proposed scrambling framework is utilized.

A. Low Latency Model

Low delay video applications require In-Line Power Patch Panel (IPPP) coding structure. Each frame is predicted from previous frame (in display order). For any missing slice data, it is preferably being predicted from its spatial neighboring data or immediate temporal neighbors. The well-known error concealment technique for low latency is Picture Copy, where missing pixel data in the current picture is copied from the corresponding pixel in reference picture. In the context of H.264, it is sufficient to assign the index vector [s, t] for each slice, where s is the raster-ordered slice number within a frame and t is the frame number is display order.

For scalable video coding, there is an extra dimension of spatial scalability. This allows error concealment techniques that utilize inter-layer correlations. An example error concealment technique for enhancement layer is Base Layer Skip and Residual Upsampling. Then, for H.264/SVC coded video packets, each slice data can be assigned with index vector [d, s, t], where d is the dependency-ordered spatial layer number.

In high latency coding models, error concealment techniques that requires reference pictures (in coding order) does not perform well, e.g. Picture-Copy, Temporal-Direct, due to the large gap between current and reference pictures. This large gap implies lower correlation between the two pictures, and hence there is less confidence in the accuracy of the concealed data. Therefore, error concealment as post-processing approach, such as Picture-copy or template-matching (both using frames in display order), is much preferred in such scenarios. For H.264 video stream, the slice index vector [s, t] used in low latency model is applicable here. For scalable video coding, inter-layer error concealment techniques have shown to be most effective. Thus, slice data can also be assigned with index vector [d, s, t] but with a high emphasis on inter-layer measure by having the weight factor $[\lambda_d, \lambda_s, \lambda_t]$ where $\lambda_d > \lambda_s > \lambda_t$.

Simulation Examples

To evaluate the performance of the slice interleaving algorithm (method) in accordance to various embodiments, a number of simulations have been conducted using the video codec JSVM 9_19_7. A series of QCIF video sequences, Foreman, Football, City and News with a frame rate of 15 Hz are tested. They are compressed using a fixed QP30. Each sequence is separated into groups of 9 frames, where the first frame in each group is assumed to be correctly received to stop error propagation in the reconstructed sequence. Slice interleaving is carried out on each group of frames except the first frame. Every frame contains 9 independently-decodable slices, each of which consists of a row of macroblocks (MBs).

The packet loss patterns are randomly generated for a certain average packet loss rate (10%, 20%, 30%, 40% and 50%). And a two-state Markov model is applied to approximate the burst packet-erasure channel. Due to the random nature of such a channel, the simulations are carried out 500 times under each packet loss rate. Error concealment mechanism is employed to recover the missing information. To demonstrate the advantage of the algorithm in accordance to various embodiments, the performance of the algorithm in accordance to various embodiments is compared together with another two schemes given the packet number P=9.

Figure 9:
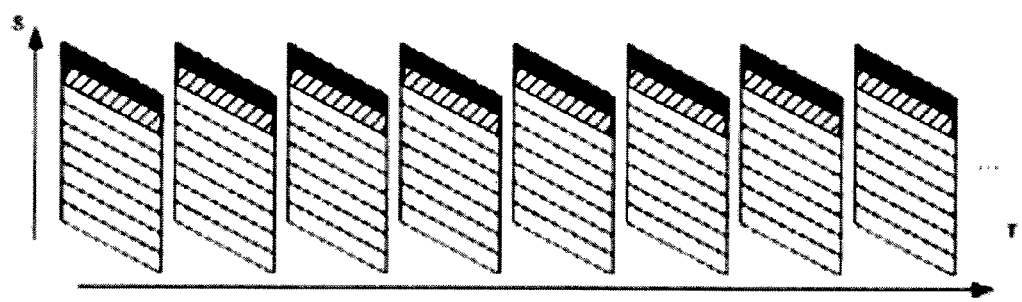
FIG. 9 shows an example scattered pattern reflecting scheme 1.

In "Scheme 1", the slices at the same spatial position of different frames are grouped into the same packet (FIG. 9).

Figure 10:
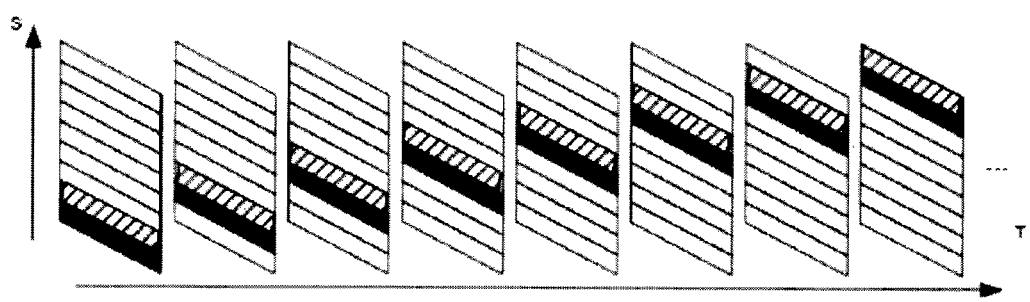
FIG. 10 shows an example scattered pattern reflecting scheme 2.

In "Scheme 2", the basis vectors are deliberately selected to be $u_1=(1,1)^T$ and $u_2=(9,0)^T$, as shown in FIG. 10.

Table I shows the average PSNR of the reconstructed video under different packet loss rate using different interleaving schemes for various video sequences.

TABLE I

| Packet Loss Rate | Average PSNR of the reconstructed video (dB) | | | | | | | | | | | |
|---|---|---|---|---|---|---|---|---|---|---|---|---|
| | Scheme 1 | | | | Scheme 2 | | | | Algorithm as in an embodiment | | | |
| | Foreman | Football | City | News | Foreman | Football | City | News | Foreman | Football | City | News |
| 10% | 31.35 | 27.29 | 31.60 | 35.18 | 33.54 | 28.13 | 33.77 | 36.50 | 34.19 | 28.44 | 34.12 | 36.72 |
| 20% | 29.00 | 24.20 | 29.58 | 33.71 | 31.22 | 25.08 | 32.07 | 35.78 | 31.84 | 25.41 | 32.62 | 36.14 |
| 30% | 27.43 | 22.45 | 28.23 | 32.54 | 29.34 | 23.20 | 30.49 | 34.89 | 29.87 | 23.46 | 31.01 | 35.25 |
| 40% | 26.18 | 21.17 | 27.19 | 31.61 | 27.75 | 21.76 | 29.08 | 33.81 | 28.09 | 21.96 | 29.38 | 34.07 |
| 50% | 25.12 | 20.12 | 26.30 | 30.86 | 26.31 | 20.55 | 27.75 | 32.53 | 26.48 | 20.66 | 27.88 | 32.60 |

B. High Latency Model

High delay video applications include scenarios where B-pictures are used. Examples are the hierarchical B-picture coding structure used in H.264/SVC and the IBBBP coding order used in H.264.

It can be observed from Table I that scheme 1 produces the worst results under any scenario. It could be expected because using the interleaving structure of scheme 1, when packet loss occurs the slices at the same location of consecutive frames are lost together, which makes the temporal neighboring information unavailable. In contrast, scheme 2 achieves better results since it tries to packetize the temporal immediate neighboring slices into different packets. The algorithm in accordance to various embodiments outperforms both scheme 1 and scheme 2 under any packet loss rate for any video sequence. The reason is the optimal slice interleaving algorithm always makes great effort to separate the neighboring slices as far as possible, hence the erroneous slices will be most largely isolated, which is important for effectively employing error concealment techniques. With increasing of the packet loss rate, more packets are likely to be lost. There will be only a small amount of available information for error concealment no matter which interleaving scheme is applied.

Figure 11:
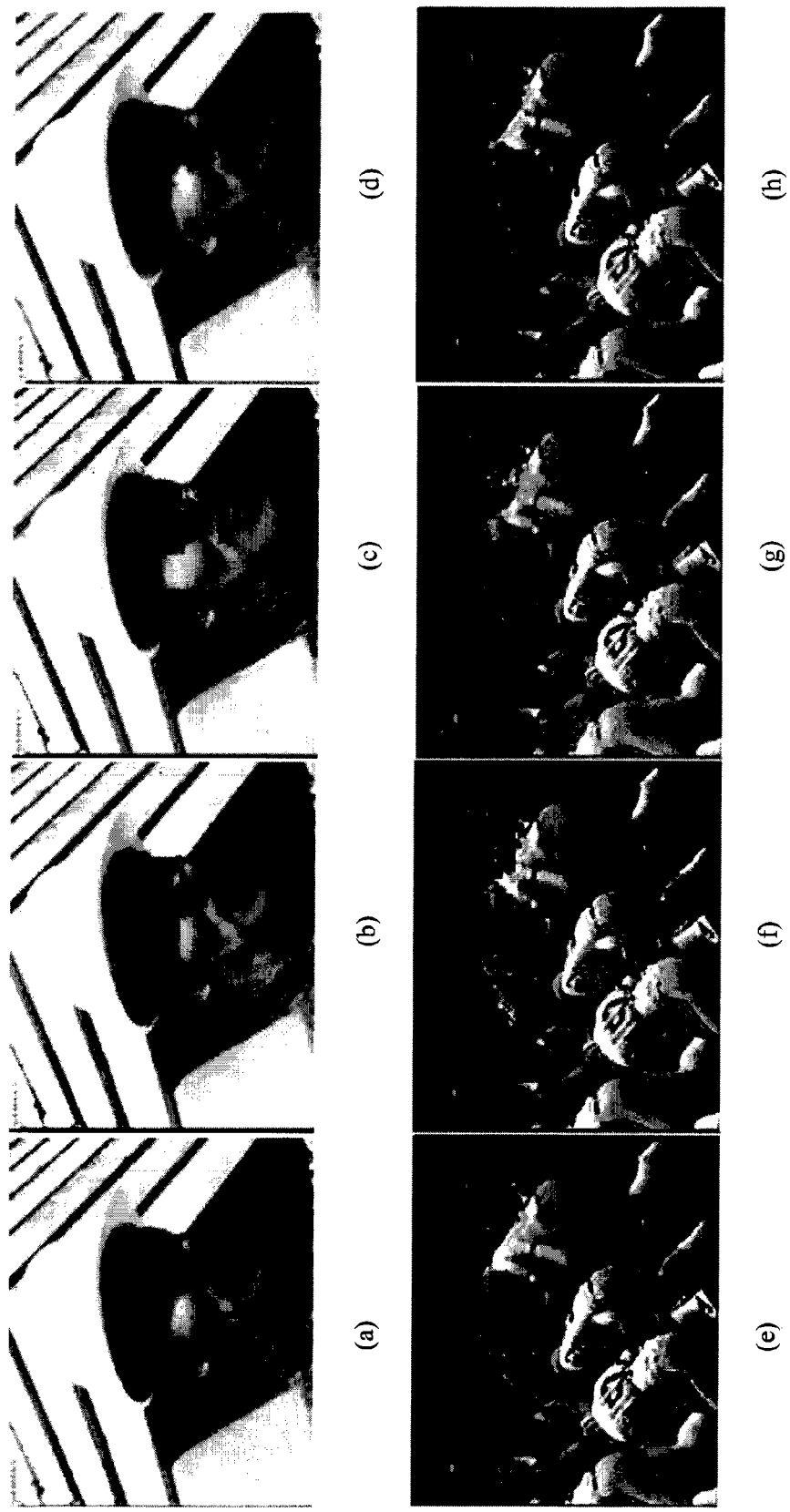
FIG. 11 shows frames when there is one packet loss among a group of frames for Foreman and Football under different schemes, in accordance to various embodiments.
Figure 12A:
FIG. 12 shows simulated examples for three consecutive frames for the Foreman under different schemes, in accordance to various embodiments.
Figure 12B:
Figure 12C:
Figure 12D:
Figure 13A:
FIG. 13 shows simulated examples for the Football under different schemes, in accordance to various embodiments.
Figure 13B:
Figure 13C:
Figure 13D:
Figure 13E:

Selected reconstructed frames to make subjective comparisons are used. When one packet loss is considered for a group of frames, the error concealed frames for Foreman and Football are shown in FIG. 11. As we can see from FIG. 11, the slice at the same position (in this case, frame 3 for the Foreman and frame 5 for the Football) is erroneous and concealed under three schemes. The subjective quality of the concealed pictures using scheme 1 is very bad (or poor), as seen in FIGS. 11(b) and 11(f). Scheme 2, as seen in FIGS. 11(c) and 11(g) achieves improvement subjectively mainly because that the temporal immediate neighboring slice could be used for error concealment. The visual quality of the concealed pictures using the method in accordance to various embodiments as seen in FIGS. 11(d) and 11(h) is superior to other schemes, which is consistent to the results in Table I.

To further illustrate, simulated examples for three consecutive frames for the Foreman under three schemes are shown in FIG. 12. FIG. 12(a) shows the original lossless scenario. The darken areas FIGS. 12(b)(i)-(iii), 12(c)(i)-(iii), and 12(d)(i)-(iii) indicate the loss of a packet. FIG. 12(b) shows poor subjective quality of the concealed pictures using scheme 1 on three consecutive frames. FIG. 12(c) shows improved quality of the concealed pictures using scheme 2 on three consecutive frames. FIG. 12(s) shows good quality reconstruction using the algorithm in accordance to various embodiments despite the packet loss and this is comparable to the original lossless scenario of FIG. 12(a).

Yet further simulated examples for the Football under three schemes are shown in FIG. 13 with FIGS. 13(a) to 13(e) illustrating the original lossless scenario, the packet loss, the concealed pictures using scheme 1, the concealed pictures using scheme 2, and the concealed pictures using the algorithm in accordance to various embodiments, respectively. The observations of FIG. 12 are similarly applicable to FIG. 13 for each of the schemes. Distortions or erroneous concealment in schemes 1 and 2 are indicated by the circled areas in FIGS. 13(c) and 13(d), respectively.

Figure 14:
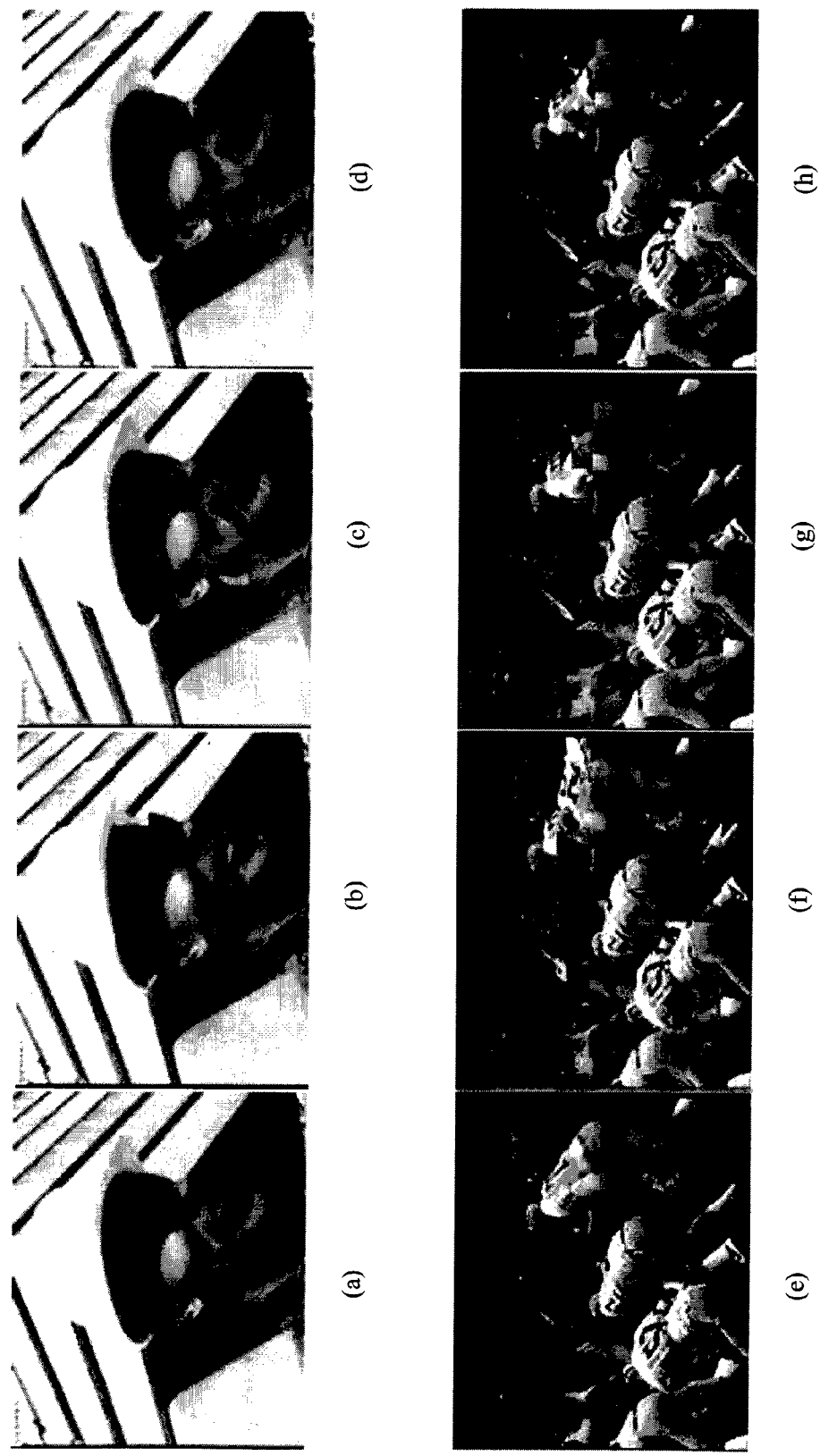
FIG. 14 shows frames when there are two packet losses among a group of frames for Foreman and Football under different schemes, in accordance to various embodiments.

FIG. 14 shows the error concealed frames when there are two packet losses among a group of frames. Similar observations to FIG. 14 can be seen for FIG. 14. It confirms that the reconstructed video quality could be improved by dispersing the error. Hence, the distance-based objective function is effective for optimization of the slice interleaving structure.

The problem of slice interleaving for video packetization are addressed to provide sufficient robustness for the transmitted video without introducing extra redundancy, a distance-based slice interleaving algorithm in accordance to various embodiments optimally group slices into packets. Considering the maximum minimal distance of slices in consecutive frames, the interleaving algorithm can effectively disperse corrupted slices caused by channel errors, thereby enabling the error concealment to achieve better performance. The simulation examples indicate that the error resilient performance is greatly improved using the algorithm in accordance to various embodiments compared with other methods in the error-prone environment.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method for packetizing data representing a video sequence comprising a first frame and a second frame, wherein the data comprises data from which the first frame is reconstructable and comprises data from which the second frame is reconstructable, the method comprising:

determining for at least one first area of a plurality of first areas of the first frame a second area of a plurality of second areas of the second frame such that for different first areas different second areas are determined and such that, for each of the first areas, a measure of the distance between the second area determined for the first area and an area of the second frame whose location within the second frame corresponds to the location of the first area is above a value, wherein the value is a maximum value allowing that for at least one first area of the plurality of first areas of the first frame a second area of the plurality of second areas of the second frame is determined such that for different first areas different second areas are determined and such that, for each of the first areas, a measure of the distance between the second area determined for the first area and an area of the second frame whose location within the second frame corresponds to the location of the first area is above the value;

and grouping, for each of the first areas, data from which the first area is reconstructable and data from which the second area determined for the first area is reconstructable into a packet, wherein the second area of the plurality of second areas of the second frame determined for the first area of the plurality of first areas of the first frame is determined based on an interleaving structure providing the maximum value, the interleaving structure associating at least the second area with the first area.

2. The method as claimed in claim 1, wherein the value is based on a maximum minimal distance of the areas, determined by the interleaving structure, wherein the interleaving structure is a distance-based interleaving structure $\Gamma^*$ which is expressed as:

$$\Gamma^* = \arg_\Gamma \max d_{min}(\Gamma)$$

where $d_{min}(\Gamma)$ is the minimum among all $d_{min}^i$ under the interleaving structure $\Gamma$, represented by $$d_{min}(\Gamma) = \min_{i=0,1,2,\ldots,P-1} d_{min}^i;$$

$d_{min}^i$ is the minimal distance between any two areas in the $i^{th}$ packet, represented by $$d_{min}^i = \min_{L(t,s),L(t',s') \in \chi_i, L(t,s) \neq L(t',s')} d(L(t,s), L(t',s'));$$

i=0, 1, . . . , P−1 with P being the total number of packets;

d(L(t,s),L(t',s')) is the Euclidean distance between a first area L(t, s) and a second area L(t', s') with t and t' denoting temporal positions while s and s' denoting spatial positions, the spatial positions being locations within a same frame, represented by $$d(L(t,s), L(t',s')) = \sqrt{d_T^2(L(t,s), L(t',s')) + d_S^2(L(t,s), L(t',s'))};$$

$d_T(L(t,s),L(t',s'))$ is the temporal distance between the first area and the second area, represented by $d_T(L(t,s),L(t',s'))=|t−t'|$; and $d_S(L(t,s),L(t',s'))$ is the spatial distance between the first area and the second area, represented by $d_S(L(t,s),L(t',s'))=\lambda|s−s'|$, where $\lambda$ is a scaling factor.

3. The method as claimed in claim 2, wherein the value of $\lambda$ is about 1 to about 1.5.

4. The method as claimed in claim 2, wherein the distance-based interleaving structure Γ* is configured to translate into a maximal-distance-producing translation matrix U* in a lattice across which all the packets are being substantially uniformly distributed.

5. The method as claimed in claim 4, wherein in the lattice, each packet comprises a first area L'(t, s), a second area L'(t+$u_{11}$, s+$u_{12}$), and a third area L'(t+$u_{21}$, s+$u_{22}$) where $u_{11}$, $u_{12}$, $u_{21}$, and $u_{22}$ are vector components forming a translation matrix U, represented by $$U = \begin{bmatrix} u_{11} & u_{21} \\ u_{12} & u_{22} \end{bmatrix}.$$

6. The method as claimed in claim 5, wherein the vector components $u_{11}$, $u_{12}$, $u_{21}$, and $u_{22}$ forms a fundamental period in the lattice.

7. The method as claimed in claim 6, wherein the fundamental period is a parallelogram.

8. The method as claimed in claim 5, wherein the maximal-distance-producing translation matrix U* is selected from a set of translation matrices Us which are similar to a hexagonal shape.

9. The method as claimed in claim 8, wherein the set of translation matrices Us are determined to be similar to a hexagonal shape by comparing the similarity between the fundamental period of each translation matrix U in the set and a typical hexagon.

10. The method as claimed in claim 5, wherein the maximum minimal distance is a maximum of $d_{min}$ where $$d_{min} = \min\{\|(u_{11},\lambda u_{12})\|, \|(u_{21},\lambda u_{22})\|, \|(u_{11},\lambda u_{12})+(u_{21},\lambda u_{22})\|, \|(u_{11},\lambda u_{12})-(u_{21},\lambda u_{22})\|\}.$$

11. An apparatus for packetizing data representing a video sequence comprising a first frame and a second frame, wherein the data comprises data from which the first frame is reconstructable and comprises data from which the second frame is reconstructable, the apparatus comprising:

a determining unit for determining for at least one first area of a plurality of first areas of the first frame a second area of a plurality of second areas of the second frame such that for different first areas different second areas are determined and such that, for each of the first areas, a measure of the distance between the second area determined for the first area and an area of the second frame whose location within the second frame corresponds to the location of the first area is above a value;

wherein the value is a maximum value allowing that for at least one first area of the plurality of first areas of the first frame a second area of the plurality of second areas of the second frame is determined such that for different first areas different second areas are determined and such that, for each of the first areas, a measure of the distance between the second area determined for the first area and an area of the second frame whose location within the second frame corresponds to the location of the first area is above the value;

and a grouping unit for grouping, for each of the first areas, data from which the first area is reconstructable and data from which the second area determined for the first area is reconstructable into a packet, wherein the second area of the plurality of second areas of the second frame determined for the first area of the plurality of first areas of the first frame is determined based on an interleaving structure providing the maximum value, the interleaving structure associating at least the second area with the first area.

12. The apparatus as claimed in claim 11, wherein the value is based on a maximum minimal distance of the areas, determined by the interleaving structure, wherein the interleaving structure is a distance-based interleaving structure Γ* which is expressed as:

$$\Gamma^* = \arg_\Gamma \max d_{min}(\Gamma)$$

where $d_{min}(\Gamma)$ is the minimum among all $d_{min}^i$ under the interleaving structure Γ, represented by $$d_{min}(\Gamma) = \min_{i=0,1,2,\ldots,P-1} d_{min}^i;$$

$d_{min}^i$ is the minimal distance between any two areas in the $i^{th}$ packet, represented by $$d_{min}^i = \min_{L(t,s),L(t',s') \in \chi_i, L(t,s) \neq L(t',s')} d(L(t,s), L(t',s'));$$

i=0, 1, . . . , P−1 with P being the total number of packets;

d(L(t,s),L(t',s')) is the Euclidean distance between a first area L(t, s) and a second area L(t', s') with t and t' denoting temporal positions while s and s' denoting spatial positions, the spatial positions being locations within a same frame, represented by $$d(L(t,s), L(t',s')) = \sqrt{d_T^2(L(t,s), L(t',s')) + d_S^2(L(t,s), L(t',s'))};$$

$d_T(L(t,s),L(t',s'))$ is the temporal distance between the first area and the second area, represented by $d_T(L(t,s),L(t',s'))=|t−t'|$; and $d_s(L(t,s),L(t',s'))$ is the spatial distance between the first area and the second area, represented by $d_s(L(t,s),L(t',s'))=\lambda|s-s'|$, where $\lambda$ is a scaling factor.

13. The apparatus as claimed in claim 12, wherein the value of $\lambda$ is about 1 to about 1.5.

14. The apparatus as claimed in claim 12, wherein the determining unit further comprises a translation unit for translating the distance-based interleaving structure $\Gamma^*$ into a maximal-distance-producing translation matrix $U^*$ in a lattice across which all the packets are being substantially uniformly distributed.

15. The apparatus as claimed in claim 14, wherein in the lattice, each packet comprises a first area $L'(t, s)$, a second area $L'(t+u_{11}, s+u_{12})$, and a third area $L'(t+u_{21}, s+u_{22})$ where $u_{11}$, $u_{12}$, $u_{21}$, and $u_{22}$ are vector components forming a translation matrix U, represented by $$U = \begin{bmatrix} u_{11} & u_{21} \\ u_{12} & u_{22} \end{bmatrix}.$$

16. The apparatus as claimed in claim 15, wherein the vector components $u_{11}$, $u_{12}$, $u_{21}$, and $u_{22}$ forms a fundamental period in the lattice.

17. The apparatus as claimed in claim 16, wherein the fundamental period is a parallelogram.

18. The apparatus as claimed in claim 15, wherein the maximal-distance-producing translation matrix $U^*$ is selected from a set of translation matrices Us which are similar to a hexagonal shape.

19. The apparatus as claimed in claim 18, wherein the set of translation matrices Us is determined to be similar to a hexagonal shape by comparing the similarity between the fundamental period of each translation matrix U in the set and a typical hexagon.

20. The apparatus as claimed in claim 15, wherein the maximum minimal distance is a maximum of $d_{min}$ where $d_{min}=\min\{\|(u_{11},\lambda u_{12})\|,\|(u_{21},\lambda u_{22})\|,\|(u_{11},\lambda u_{12})+(u_{21},\lambda u_{22})\|,\|(u_{11},\lambda u_{12})-(u_{21},\lambda u_{22})\|\}$.

\* \* \* \* \*